E. ORR.
FLY TRAP ATTACHMENT FOR SCREEN DOORS.
APPLICATION FILED AUG. 13, 1910.
985,626.
Patented Feb. 28, 1911.
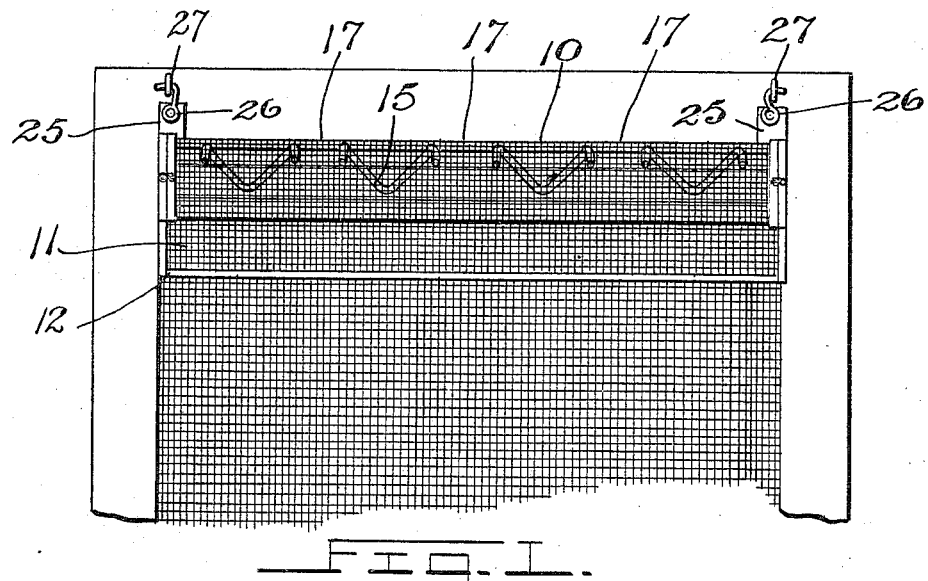
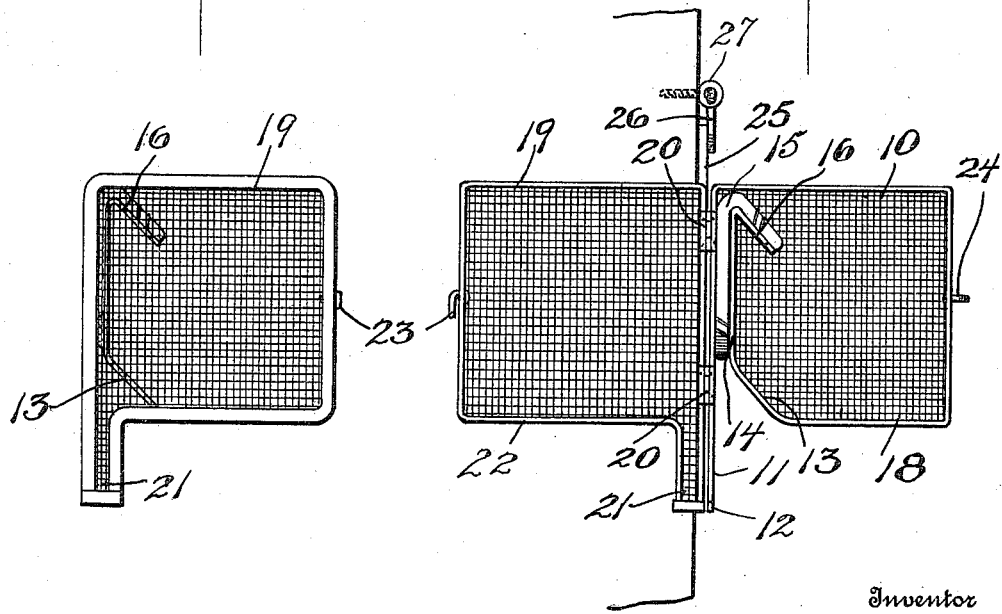
Witnesses
E. E. Johansen
J. E. Burch
Inventor
Edward Orr.
By Woodward & Chandlee
Attorneys
THE NORRIS PETERS CO., WASHINGTON, D.C.

UNITED STATES PATENT OFFICE.

EDWARD ORR, OF NORTH YAKIMA, WASHINGTON.

FLY-TRAP ATTACHMENT FOR SCREEN-DOORS.

985,626.     Specification of Letters Patent.     Patented Feb. 28, 1911.

Application filed August 13, 1910. Serial No. 576,955.

*To all whom it may concern:*

Be it known that I, EDWARD ORR, a citizen of the United States, residing at North Yakima, in the county of Yakima and State of Washington, have invented certain new and useful Improvements in Fly-Trap Attachments for Screen-Doors, of which the following is a specification.

This invention relates to new and useful improvements in insect traps and more particularly to such a trap usually termed a fly-trap and which is more especially adapted for attachment to screen doors or windows.

The invention has for its object to provide a simple structure in such devices which may be readily and cheaply manufactured and which will insure of the guidance of the insects into the trap but will preclude any exit therefrom.

A still further object is to provide a novel arrangement of parts and manner of securing the parts of the screen to form the entrance openings of the trap.

Other objects and advantages will be apparent from the following description, and it will be understood that changes in the specific structure shown and described may be made within the scope of the claims without departing from the spirit of the invention.

In the drawings: Figure 1 is a front elevation of my improved trap, showing the same applied to a window screen or door, Fig. 2 is an end elevation of the device, Fig. 3 is a view similar to Fig. 2 but showing the door open.

Referring to the drawings in which similar reference characters designate like parts throughout the several views 10 designates the body of the trap which is constructed of the usual wire mesh and is preferably rectangular in cross section and has its rear attaching portion 11 depending a short distance below the bottom of the body portion and is provided with a suitable metallic binding 12 extending throughout the length of the lower portion thereof.

The bottom portion of the body of the trap is bent upwardly at an angle toward the rear portion 11 as shown at 13 to provide a guide to insure of the travel of the insects into the trap. Said bottom portion is then extended in close proximity to the rear portion as shown at 14 but is spaced therefrom for a purpose to be made more clearly apparent and is then bent downwardly and approximately at an angle of 45 degrees and depending a short distance into the trap and having its lower edge provided with a similar binding 12 as the rear portion 11.

Disposed intermediate the rear portion 11 and its adjacent portion 14 are a plurality of wires 15 which are approximately V-shaped and are secured to said portions 11 and 14 at spaced distances from each other. As will also be noted the upper ends of the wires 15 are extended over the depending portion 16 where they are secured and an insect traveling up the rear portion 11 or between the adjacent sections of the screen, will be guided through the entrance openings 17 and into the trap but will be unable to escape therefrom and by reason of having the downturned portion 16, the insects or flies in the attempt to escape will be deflected and guided to the bottom portion thereof and their attempt to escape will have been to no avail.

In order that the body of the trap may be readily cleaned or the dead insects removed therefrom I provide the rear portion 11 adjacent each end with a metallic border 18 which is also extended around the ends of the body of the screen forming the trap, and doors 19 are hingedly secured to said border portions 18 as at 20, said doors being provided with a depending tongue 21 whereby the same is attached at the lower end of the portion 11. It will thus be seen that the flange portion 22 of the doors when said doors are in a closed position, will be disposed over the surrounding borders 18 and may be held in a closed position by means of a hook and eye 23 and 24 respectively applied to the door and the borders. The device can therefore be readily cleaned and in order to support the same upon a screen or door I provide the rear portion thereof with plates 25 adapted for connecting suitable hooks 26 which may be engaged with suitable eyes 27 carried by the door or screen so that the trap may be properly supported in position. From the foreging it will be apparent that the device will very efficiently serve the purposes intended and will prove very advantageous in preventing the annoyance usually occuring from the infestation of flies during the summer seasons.

What is claim is:

1. A trap of the character described comprising a body of wire screen material, said body having a depending rear portion provided with a metallic border, the bottom portion of said body being extended upwardly at an angle toward the rear portion and then upwardly in close proximity to said rear portion and terminating in an inturned portion at its upper end, a plurality of V-shaped wire pieces disposed between said upturned portion and the rear portion at spaced distances from each other, said wire pieces being bent downwardly upon the downturned portions and providing suitable guide and entrance openings, borders on the ends of said body, hinged doors secured to said borders of the rear portion and means for securing said doors in a closed position.

2. A trap comprising a body having a rear portion and a bottom portion, said bottom portion being bent upwardly and extending inwardly at an angle of approximately 45 degrees, bent wire pieces disposed between said rear and upturned portions at spaced distances from each other and secured thereto to form suitable entrance openings adapted to guide the insects into the trap, hinged closures for the ends of the body of the trap and hooked members carried by the body at each end thereof for engagement with suitable eyes upon a screen or door for supporting the trap.

In testimony whereof I affix my signature, in presence of two witnesses.

EDWARD ORR.

Witnesses:
E. A. RUTLEDGE,
A. GRODING.

---

Copies of this patent may be obtained for five cents each, by addressing the "Commissioner of Patents, Washington, D. C."